United States Patent [19]

Sota et al.

[11] Patent Number: 5,241,432
[45] Date of Patent: Aug. 31, 1993

[54] ENDLESS TAPE CONVEYING DEVICE

[75] Inventors: Koichi Sota; Toshiaki Shima, both of Chohu, Japan

[73] Assignee: Otari Inc., Chohu, Japan

[21] Appl. No.: 658,069

[22] Filed: Feb. 19, 1991

[30] Foreign Application Priority Data

Feb. 28, 1990 [JP] Japan .................................. 2-50098

[51] Int. Cl.$^5$ ....................... B65H 20/28; G11B 5/86
[52] U.S. Cl. ...................................... 360/71; 360/15; 226/119; 242/183
[58] Field of Search ................. 360/15, 16, 71, 73.04, 360/74.1; 242/182, 183, 75.2; 226/118, 119

[56] References Cited

U.S. PATENT DOCUMENTS

| | | | |
|---|---|---|---|
| 4,000,516 | 12/1976 | Watanabe et al. | 360/71 |
| 4,727,442 | 2/1988 | Clark | 242/75.2 X |
| 4,901,167 | 2/1990 | Gantzhorn, Jr. et al. | 360/15 |

Primary Examiner—Joseph L. Dixon
Assistant Examiner—David L. Robertson
Attorney, Agent, or Firm—David O'Reilly

[57] ABSTRACT

A tape conveying device has a loop bin which accomodates a meandering endless tape. The tape loop bin comprises a tape drive means, a tape running speed detecting means for detecting the running speed of the endless tape from the operating condition of said tape drive means, a tape conveying means for conveying the endless tape to meanderingly run in said loop bin to an exit from said loop bin, and a tape conveying control means complying with a running speed signal of the endless tape received from the tape running speed detecting means. Endless tape fed into the loop bin by a tape driving means travels toward an outlet from the loop bin. The tape conveying means is controlled to comply with a tape running speed signal sent from the tape running speed detecting means so that the operation of the tape conveying means is stopped before movement of the endless tape is stopped. After conveying of endless tape is stopped, the endless tape continues moving for a while as the tape running speed of the endless tape decreases. Therefore endless tape accumulation near the loop bin outlet is prevented.

6 Claims, 3 Drawing Sheets

ENDLESS TAPE CONVEYING DEVICE

BACKGROUND OF THE INVENTION

1. Field of the Invention

The present invention relates to an endless tape running device for conveying an endless magnetic tape.

2. Description of the Prior Art

Heretofore, a tape running device is described in Japanese Patent Laid Open No. 63-268176 wherein a tape conveying mechanism conveys endless tape in a loop bin in a manner allowing endless tape to be dispersed uniformly in the loop bin, and preventing the accumulation of a winding endless tape.

However, when a running endless tape is stopped while the operation of the tape conveying mechanism is stopped, a portion of the winding endless tape accumulates near an outlet of the loop bin. When the endless tape again starts to run when the operation of the tape conveying mechanism is started, the accumulated portion of the endless tape is drawn out through the outlet of the loop bin causing the endless tape to be folded, or strained.

SUMMARY OF THE INVENTION

It is therefore an object of the present invention to provide a tape running or conveying device wherein the accumulation of a winding endless tape near the outlet of a loop bin is prevented.

To this end, the tape conveying device has a loop bin which accommodates winding endless tape that comprises:

- a tape drive means for feeding the endless tape into a loop bin;
- a tape conveying speed detecting means for detecting the conveying speed of an endless tape from the operating state of the tape drive means;
- a tape conveying means for conveying the endless tape winding in the loop bin toward an exit; and
- a tape conveying control means complying with a conveying speed signal of the endless tape sent from the tape running speed detecting means.

In the present invention, first and second reference signals are set for conveying speeds of the endless tape which are detected by the tape conveying speed detecting device. When the speed of said endless tape reachs the first reference signal level, the tape conveying means starts, and when the speed of the endless tape increases over the first and second reference signal levels, the operation of the tape conveying means is stopped.

Further, in the present invention, the tape conveying control means has memory to store length information of the endless tape, and the operating speed of the tape conveying means is controlled to comply with the operating speed of the tape drive means.

According to the present invention, the endless tape fed into the loop bin by the tape drive means travels toward an outlet of the loop bin, wherein the tape conveying means is controlled to comply with a tape speed signal sent from a tape running speed detecting means so that operation of the tape conveying means is stopped a moment before the endless tape stops running. After the endless tape conveyor is stopped, the endless tape continues moving for a while as the running speed of the endless tape decreases. Therefore accumulation of the endless tape near the outlet of the loop bin is prevented.

BRIEF DESCRIPTION OF THE DRAWINGS

The above objects, characteristics, and advantages of the present invention will become apparent from the following detailed description of the preferred embodiments, with reference to the accompanying drawings which are presented as non-limiting examples, in which.

DETAILED DESCRIPTION OF PREFERRED EMBODIMENTS

Figure 1:
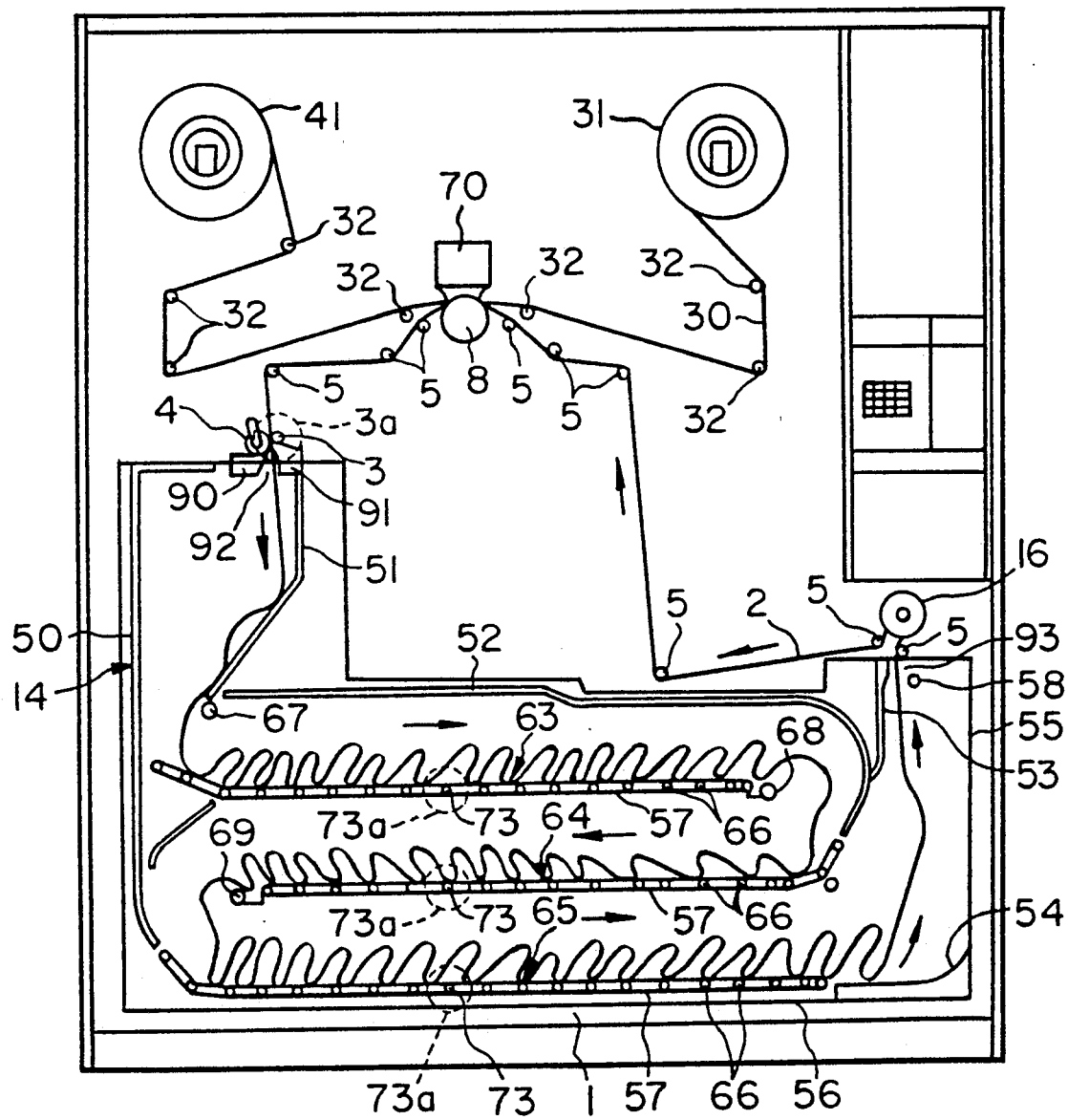
FIG. 1 is a schematic elevational view of a tape conveying device according to the present invention.

Referring to FIGS. 1, a tape conveying device according to the present invention comprises panel base 1 disposed generally perpendicular to a floor, loop bin 14 and a transferring part in which a transfer can be carried out. Master tape 2 is disposed in an endless loop positioned circularly counterclockwise in the direction of the arrow through loop bin 14 and the transferring part. Copy tape 30 is fed from supply reel 31, and travels at a constant speed to winding reel 41 through transfer roller 8. Transfer is carried out by superposing copy tape 30 upon master tape 2 on transfer roller 8. Master tape 2 is fed at constant speed together with copy tape 30 by the frictional force between master tape 2 and copy tape 30.

Loop bin 14 is comprised of first, second, third, fourth, and fifth guide rails 50, 51, 52, 53, 54 and first, second, and third tape conveying mechanisms 63, 64, 65. First, second, third, fourth, and fifth guide rails 50, 51, 52, 53, 54 are mounted on panel base 1. Glass plate 56 is attached to first, second, third, fourth, and fifth guide rails 50, 51, 52, 53, 54 so that a space for housing master tape 2 can be formed between panel base 1 and glass plate 56. First and second introducing blocks 90, 91 are arranged at the upper ends of first and second guide rails 50, 51. Between first and second introducing blocks 90, 91, inlet 92 is provided for introducing master tape 2 into loop bin 14. Between the upper end of fourth guide rail 53 and guide roller 58, outlet 93 is provided for drawing master tape 2 out from loop bin 14. First, second, and third tape conveying mechanism 63, 64, 65, which are the tape conveying means, are mounted generally horizontally in loop bin 14, respectively, so that the inside of loop bin 14 is divided into three sections. Each of first, second, and third tape conveying mechanisms 63, 64, 65 is comprised of driving roller 73 rotated at a constant speed by a motor, a number of rotary rollers 66, and a number of belts 57. Rotary rollers 66 are rotatably mounted on panel base 1 to form a line. Belts 57 have a circular shape, made of rubber, and are put on rotary rollers 66. Rotation of driving rollers 73 is transmitted to belt 57 so that winding master tape 2 is moved with the motion of belt 57. First guide pole 67 is rotatably mounted near an end of guide rail 52. Second guide pole 68 is rotatably disposed near the right end of first tape conveying mechanism 63, and third guide pole 69 is rotatably disposed near the left end of second tape conveying mechanism 64. First, second, and third guide pole 67, 68, 69 are effective either when master tape 2 is first run, or when duplication ends and master tape 2 is removed from loop bin 14. For example, when meandering master tape 2 in loop bin 14 is removed through outlet 93 after duplication, friction between belts 57 of first and second tape conveying mechanisms 63, 64 and master tape 2 on first and second tape conveying mechanisms 63, 64 prevents master tape 2 from moving, therefore master tape 2 cannot be drawn out from outlet 93. First, second, and third guide poles 67, 68, 69 facilitate drawing master tape 2 out from outlet 93 so that master tape 2 can be drawn out easily without being caught by belt 57, even if belt 57 is stopped.

The following describes a transfer part of the tape conveying device illustrated. Guide rollers 5, are rotatably mounted perpendicular to panel base 1. Brake roller 16 is rotatably mounted perpendicular to panel base 1 in a manner that causes a resistance force by rotation of brake roller 16. Capstan 3 and pinch roller 4 are mounted near inlet 92. Capstan 3 is rotated by capstan motor 3a and controlled in a manner that causes tension of master tape 2 to be constant. Pinch roller 4 presses master tape 2 against capstan 3 to drive master tape 2.

Guide rollers 32, of copy tape 30 are rotatably perpendicular to panel base 1.

Transfer block 70 is mounted on panel base 1. Transfer roller 8 is disposed opposite transfer block 70. Compressed air is injected from transfer block 70 toward transfer roller 8.

The following describes the conveying device according to the present invention illustrate the feeding of master tape 2 in an endless loop.

Master tape 2 fed into loop bin 14 by capstan 3 and pinch roller 4 first drops between first and second guide rails 50, 51. Master tape 2 meanderingly flows on first tape conveying mechanism 63. Master tape 2 on first tape conveying mechanism 63 travels between third guide rail 52 and first tape conveying mechanism 63 toward second guide ball 68. Master tape 2 then drops from the edge of second guide ball 68 onto second tape conveying mechanism 64. Master tape 2 then travels between first and second conveying mechanisms 63, 64 toward third guide ball 69, and drops onto third tape conveying mechanism 65 from the edge of third guide ball 69. Master tape 2 on third tape conveying mechanism 65 travels between second and third conveying mechanisms 64, 65 toward fifth guide rail 54. Master tape 2 is then fed over guide roller 58 and through outlet 93 to the outside of loop bin 14.

Master tape 2 drawn out from loop bin 14 travels to capstan 3 through guide rollers 5. Brake roller 16 whose rotation accompanies a resistance force imposing a tension upon master tape 2 drawn out of loop bin 14 is in a free state in which tension is not applied. Further, master tape 2 is superposed upon copy tape 30 running at a constant speed so that master tape 2 travels together with copy tape 30 because of the frictional force between master tape 2 and copy tape 30. Further master tape 2 again travels into loop bin 14 through guide rollers 5, capstan 3, and pinch roller 4.

Figure 2:
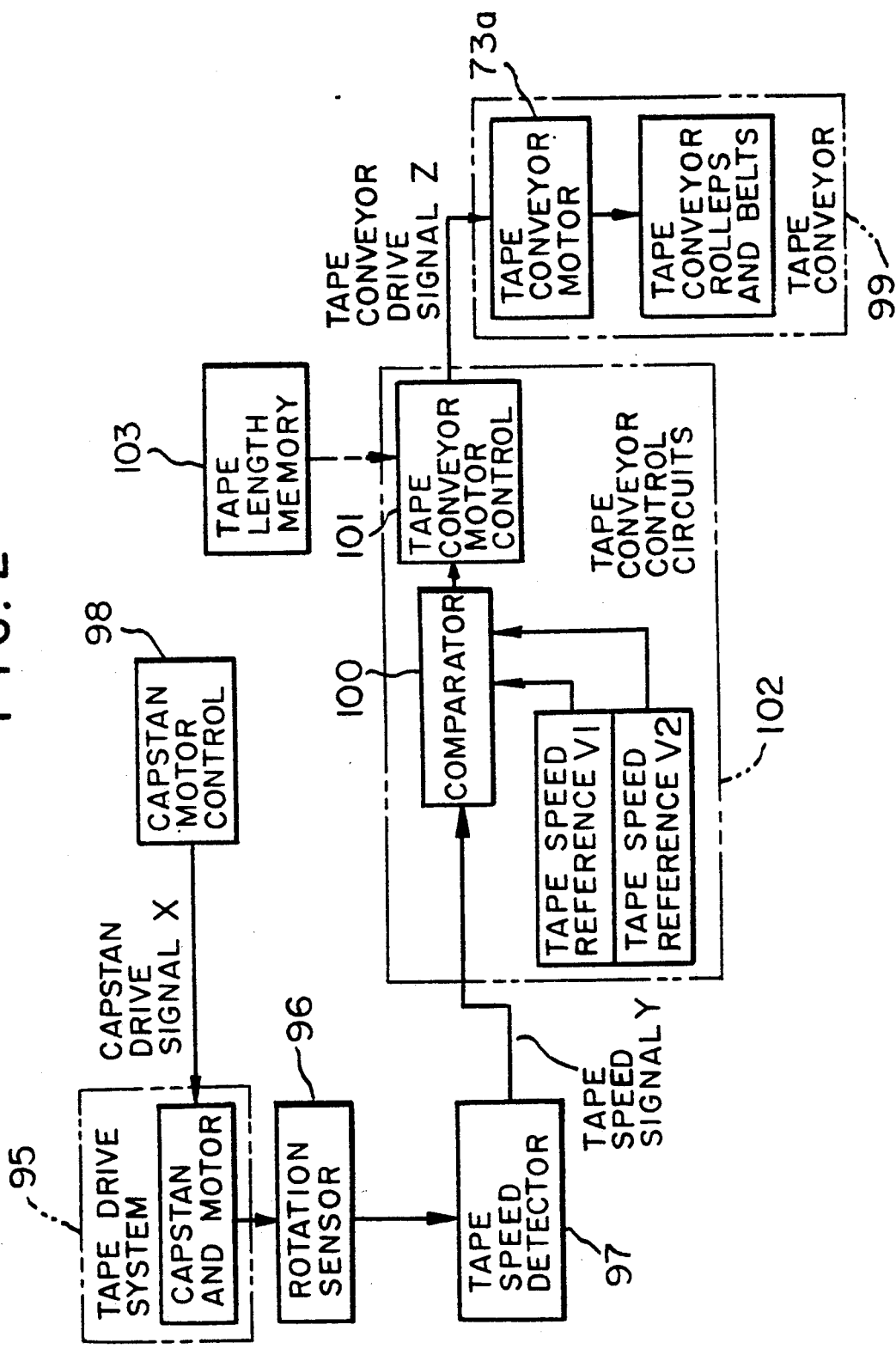
FIG. 2 is a block diagram of the tape running device of FIG. 1.

As shown in FIG. 2, tape driving means 95 is comprised of capstan 3, and capstan motor 3a driving said capstan 3. Tape running speed detecting means 97 for detecting the speed of master tape 2 is comprised of rotation sensor 96 attached to capstan motor 3a.

Capstan motor 3a is driven by driving signal X issued from capstan motor control means 98.

On the other hand, tape conveying means 99 is comprised of tape driving rollers 73, belts 57 and tape conveying motors 73a for driving belts 57.

Tape running speed signal Y issued from tape running speed detecting means 97 is sent to comparative means 100. Output of comparative means 100 is input to control means 101 of tape conveying motor 73a. Tape conveying control means 102 is comprised of the comparative means 100 and tape conveying motor control means 101.

Driving signal Z output from tape conveying control means 102 is input to tape conveying motor 73a.

Figure 3:
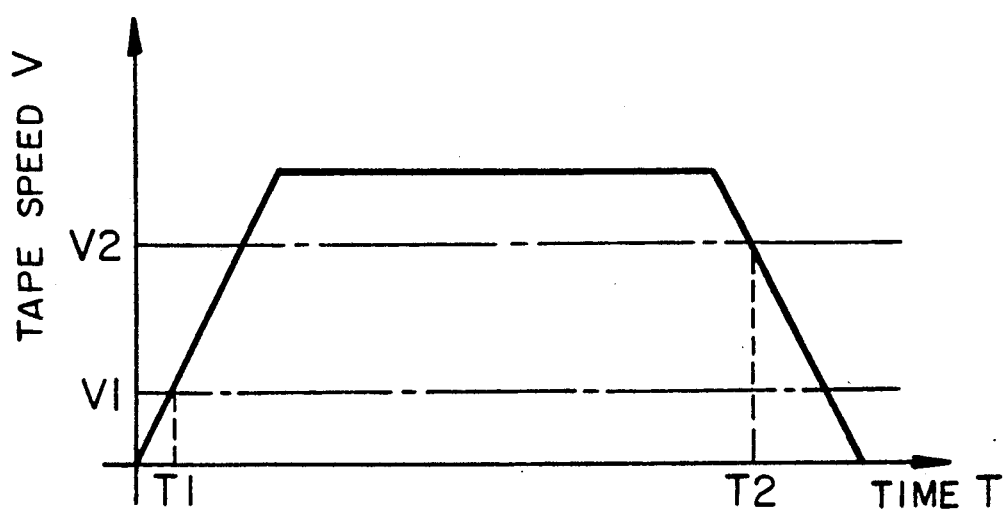
FIG. 3 is a graph showing the relation between tape running speed V and time T.

Comparative means 100 sets two reference speed $V_1$, $V_2$ in a manner that first and second tape running signal speed levels exist among tape running speeds (tape running speed) detected by tape running speed detecting means 97. As shown in FIG. 3, tape conveying control means 101 is controlled as bellows: at a time point $T_1$ when the running speed of endless master tape 2 reaches first tape running speed signal level $V_1$, operation of tape conveying means 99 is started, at time point $T_2$ when speed increases beyond first and second tape running speed levels $V_1$, $V_2$ and then tape speed decreases and again returns to second tape running speed level $V_2$, the operation of tape conveying means 99 is stopped. In FIG. 3, the ordinate shows tape running speed V and the abscissa shows time T.

Tape conveyor motor control means 101 controls the operating speed of tape conveying means 99 according to length information stored in the endless tape length information circuit 103.

The following describes operation of the tape conveying device illustrated.

When driving signal X is sent from capstan motor control means 98 to capstan motor 3a to run endless tape 2, capstan motor 3a is driven so that capstan 3 is driven, and endless tape 2 is fed into loop bin 14 by rotating capstan 3 and pinch roller 4. Tape running speed detecting means 97 detects the speed of endless tape 2 from rotation sensor 96 attached to capstan motor 3a.

The detected tape running speed signal Y is sent to tape conveying control means 102, and as shown in FIG. 3, at time point T when tape running speed reaches tape running speed V, driving signal Z is sent from motor control means 101 to tape conveying motor 73a.

Tape conveying motor 73a is driven by driving signal Z to drive rollers 73 which rotate a number of rotation rollers 66 connected with each other through belt 57, by which meandering endless tape 2 travels from inlet 92 of loop bin 14 to outlet 93 thereof.

Thereafter when endless tape 2 travels to a given position, it is stopped to send driving signal X from capstan motor control means 98 to capstan motor 3a, thereafter the running speed of endless tape 2 decreases, and as shown in FIG. 3, at time point $T_2$ when tape running speed decreases to $V_2$, it is stopped to allow sending driving signal Z from tape conveying control means 102 to tape conveying motor 73a.

After tape conveying motor 73a drive is stopped and conveying of endless tape 2 is stopped, endless tape 2 continues running for a while as the running speed slows. Therefore meandering endless tape does not accumulate near outlet 93 of loop bin 14.

Thereafter when endless tape 2 conveying completely stops, endless tape 2 is dispersed comparatively uniformly in loop bin 14.

Further, when tape conveying control means 102 receives endless tape length information from tape length circuit 103 indicating that endless tape 2 is shorter to some extent, the operating speed from endless tape conveying means 102 comparatively increases the operating speed of tape conveying means 99. When endless tape length information from tape length circuit 103 indicates that endless tape 2 is longer to some extent, tape conveying control means 102 comparatively decreases the operating speed of tape conveying means 99.

Namely, since the operating speed is determined according to the length of endless tape 2, exess force is not applied to the endless tape.

Excess endless tape does not accumulated near outlet 93, and no exess force is applied to the endless tape, so the endless tape is not folded and not strained.

This invention is not to be limited by the embodiment shown in the drawing and described in the description, which is given by way of example and not of limitation, but only in accordance with the scope of the appended claims.

What is claimed is:

1. A tape conveying device having a loop bin which accommodates winding endless tape, said tape conveying device comprising: tape drive means for feeding endless tape into said loop bin; tape running speed detecting means for detecting the speed of said endless tape from the operation of said tape drive means;

tape conveying means for conveying the winding endless tape in said loop bin to an exit from said loop bin; and tape conveying control means responsive to a signal received from said tape running speed detecting means representing the running speed of said endless tape, for controlling said tape conveying means to prevent tape accumulation in said loop bin.

2. The tape conveying device according to claim 1 including means for setting first and second reference signal levels to represent running speeds of said endless tape detected by said tape running speed detecting device, means starting said tape conveying means when the running speed of said endless tape reaches said first reference level, means stopping said tape conveying means when the speed of said endless tape increases beyond said first and second reference levels.

3. The tape conveying device as claimed in claim 1 wherein said tape conveying control means includes memory means for storing information about the length of said endless tape, the operation speed of said tape conveying means being controlled in response to the operation speed of said tape drive means.

4. A tape conveying system having an endless tape winding through a tape loop bin comprising;

tape drive means for feeding said endless tape into said tape loop bin;

tape speed detecting means for detecting the feeding speed of said endless tape, said speed detecting means sensing tape feeding speed from operation of said tape drive means;

tape conveying means in said tape loop bin for conveying said endless tape through said tape loop bin from an inlet to an outlet;

tape conveying control means controlling the operation said tape conveying means in response to a tape speed signal received from said tape speed detecting means;

whereby tape conveying speed is controlled to prevent bunching of said endless tape at said tape loop bin outlet.

5. The tape conveying system according to claim 4 in which said tape conveying control means sets first and second reference signal levels representing start and stop control signals to start and stop said tape conveying means.

6. The tape conveying system according to claim 5 including memory means connected to said tape conveying control means for storing information representing the length of said endless tape; said tape conveying means being controlled by said tape conveying control means to conform the speed of said endless tape to the operating speed of said tape drive means.

* * * * *